US009686370B2

United States Patent
Walker et al.

(12) United States Patent
(10) Patent No.: US 9,686,370 B2
(45) Date of Patent: Jun. 20, 2017

(54) WIRELESS ACCESS POINT

(75) Inventors: Mark Walker, Wiltshire (GB); Ian Hailey, Swindon (GB)

(73) Assignee: Ubiquisys Limited, Swindon (GB)

(*) Notice: Subject to any disclaimer, the term of this patent is extended or adjusted under 35 U.S.C. 154(b) by 921 days.

(21) Appl. No.: 13/502,658

(22) PCT Filed: Oct. 8, 2010

(86) PCT No.: PCT/GB2010/051697

§ 371 (c)(1),
(2), (4) Date: Aug. 9, 2012

(87) PCT Pub. No.: WO2011/048403

PCT Pub. Date: Apr. 28, 2011

(65) Prior Publication Data

US 2012/0295664 A1 Nov. 22, 2012

(30) Foreign Application Priority Data

Oct. 19, 2009 (GB) .................................. 0918217.1

(51) Int. Cl.
*H04M 1/00* (2006.01)
*H04L 29/08* (2006.01)
(Continued)

(52) U.S. Cl.
CPC ........... *H04L 67/2804* (2013.01); *H04W 8/20* (2013.01); *H04W 88/08* (2013.01)

(58) Field of Classification Search
CPC ...... H04L 67/2804; H04W 88/08; H04W 8/20
(Continued)

(56) References Cited

U.S. PATENT DOCUMENTS

2003/0037235 A1 2/2003 Aziz et al.
2003/0185240 A1 10/2003 Vuong
(Continued)

FOREIGN PATENT DOCUMENTS

CN 101132341 2/2008
CN 101345762 1/2009
(Continued)

OTHER PUBLICATIONS

International Search Report, dated Jan. 26, 2011, issued in PCT/GB2010/051697.
(Continued)

*Primary Examiner* — Xin Jia
(74) *Attorney, Agent, or Firm* — Weaver Austin Villeneuve & Sampson LLP

(57) ABSTRACT

A wireless access point may be in the form of a femtocell basestation in a cellular network. In order to establish a connection into the cellular network, an identity token is required for authorization. A remote service, accessible over a Wide Area Network such as the internet, can register with the access point. When a connected user attempts to connect to the remote service, information derived from the identity token is inserted into the data traffic. Where the identity token identifies the access point, the remote service can return location-specific information. Where the identity token identifies the connected user, the remote service can return subscriber-specific information. The access point can insert information derived directly from the identity token, or it can use the identity token to access a service identity registry, and can then insert the service identity into the data traffic.

22 Claims, 3 Drawing Sheets

(51) Int. Cl.
*H04W 8/20* (2009.01)
*H04W 88/08* (2009.01)

(58) Field of Classification Search
USPC ................................ 455/456.1, 456.2, 456.3
See application file for complete search history.

(56) References Cited

U.S. PATENT DOCUMENTS

| | | | |
|---|---|---|---|
| 2004/0049702 | A1 | 3/2004 | Subramaniam et al. |
| 2006/0239235 | A1* | 10/2006 | Oswal .................. H04L 63/102 370/338 |
| 2007/0097904 | A1 | 5/2007 | Mukherjee et al. |
| 2007/0099634 | A1 | 5/2007 | Chari et al. |
| 2007/0124802 | A1 | 5/2007 | Anton, Jr. et al. |
| 2007/0202910 | A1* | 8/2007 | Brewer et al. ................ 455/521 |
| 2008/0127320 | A1* | 5/2008 | De Lutiis et al. ................ 726/9 |
| 2008/0254833 | A1* | 10/2008 | Keevill et al. ................ 455/558 |
| 2010/0113067 | A1* | 5/2010 | Fullam et al. ............. 455/456.3 |

FOREIGN PATENT DOCUMENTS

| | | |
|---|---|---|
| CN | 101390418 | 3/2009 |
| CN | 101569216 | 10/2009 |
| JP | 2003150499 | 5/2003 |
| WO | WO 02/28026 | 4/2002 |
| WO | WO 03/050743 | 6/2003 |
| WO | WO2006/045402 | 5/2006 |
| WO | WO 2008/080903 | 7/2008 |

OTHER PUBLICATIONS

UKIPO Search Report, dated Feb. 9, 2010, issued in GB0918217.1.

CN Office Action dated May 4, 2014 for CN Application No. 201080055530.6.

CN Office Action dated Oct. 31, 2014 for CN Application No. 201080055530.6.

* cited by examiner

WIRELESS ACCESS POINT

This invention relates to an access point, and in particular to a wireless access point for providing location-based and user-based services to connected wireless devices.

In a cellular network comprising mobile internet devices (phones and computers with compatible modems, hereafter MIDs) and low power, indoor base station access points (femtocells, hereafter APs), the MIDs and APs each contain an immutable and unique identity credential. This identity credential often takes the form of a SIM, but may be a software certificate installed before first use (i.e. during manufacture). The identity is used as an authorisation credential during establishment of the lower layers of network connectivity.

For cellular telephony services, this identity of the MID is also commonly used at the application layer, where it has a one-to-one association with the caller identity.

For data services the identities are not propagated to the application layer for at least two reasons. Firstly, IP networking was designed independently of cellular networking so the non-volatile caller identity is not a necessary or essential part of establishing the service (only a return routing address for the session is required). Secondly, the identities are considered sensitive by the network operator because of their role in authorising network access, and so it is not desirable to propagate them beyond the telephony network into the internet.

The present invention describes how the identity credentials within the MID and AP can be used to provide a "caller identity" and "location tag" respectively when the MID is accessing data services via the AP.

As the use of the internet has become common, allowing users to access content that may be stored on servers all over the world, there have been corresponding attempts to provide services that are relevant in some way to the user's location.

For example, when a user accesses the internet, the IP address of the user can be used to infer some information about the user's location, and advertisements relevant to that location can be displayed to the user. For example, WO2006/031379 describes a system in which the geographical locations of various wireless access points are stored. When a user accesses a network through the wireless access point, the IP address can be used to identify the wireless access point, and the system can select for display to the user advertisements that are geographically related to the wireless access point. During normal IP network operation the IP network will reassign addresses from time to time, and can effectively pool addresses (a process known as Network Address Translation), both of which limit the resolution of IP-based location systems.

The present invention uses a unique immutable identifier associated with each individual short-range wireless access point to provide a location tag that can be used to infer location to the resolution of that access point's radio coverage. When the user accesses the network through the access point the access point automatically adds its location tag to the data sent through the network. Then, depending on what has been stored as associated with the location tag, either the geographic location or the context (i.e. "home", "office", "café") can be used to select or modify the data returned.

Similarly, many internet services allow the user to create an account to personalize the service. This usually requires that users identify themselves when they access the service, such as by entering a username, which can be awkward on a mobile device with a limited user interface. The present invention uses a unique immutable identifier associated with each mobile device to provide an identity for the owner. This identity is known to the access point due to its use in establishing the network connection, so when the user accesses the network through the access point the access point automatically adds the owner identity to the data sent through the network, so that the user does not need to identify themselves using the user interface.

In accordance with the present invention, there is provided a cellular basestation, configured to allow a device to connect thereto over a wireless interface, wherein the cellular basestation is able to establish a connection to a cellular network such that the cellular network requires an identity token for authorisation, and wherein the cellular basestation has a connection to a Wide Area Network, such that it can route data traffic from connected devices to a remote service over the Wide Area Network and, in the event that data traffic from a connected device is intended for the remote service, the access point is adapted to insert information derived from the identity token into the data traffic, and to forward the modified data traffic to the remote service.

Thus, an identity token with an existing use in the cellular network can be reused to provide identity information to the remote service accessed over the Wide Area Network. The remote service is then able to provide information that is relevant to that identity.

For a better understanding of the present invention, reference will now be made, by way of example, to the accompanying drawings, in which:—

DETAILED DESCRIPTION

Figure 1:
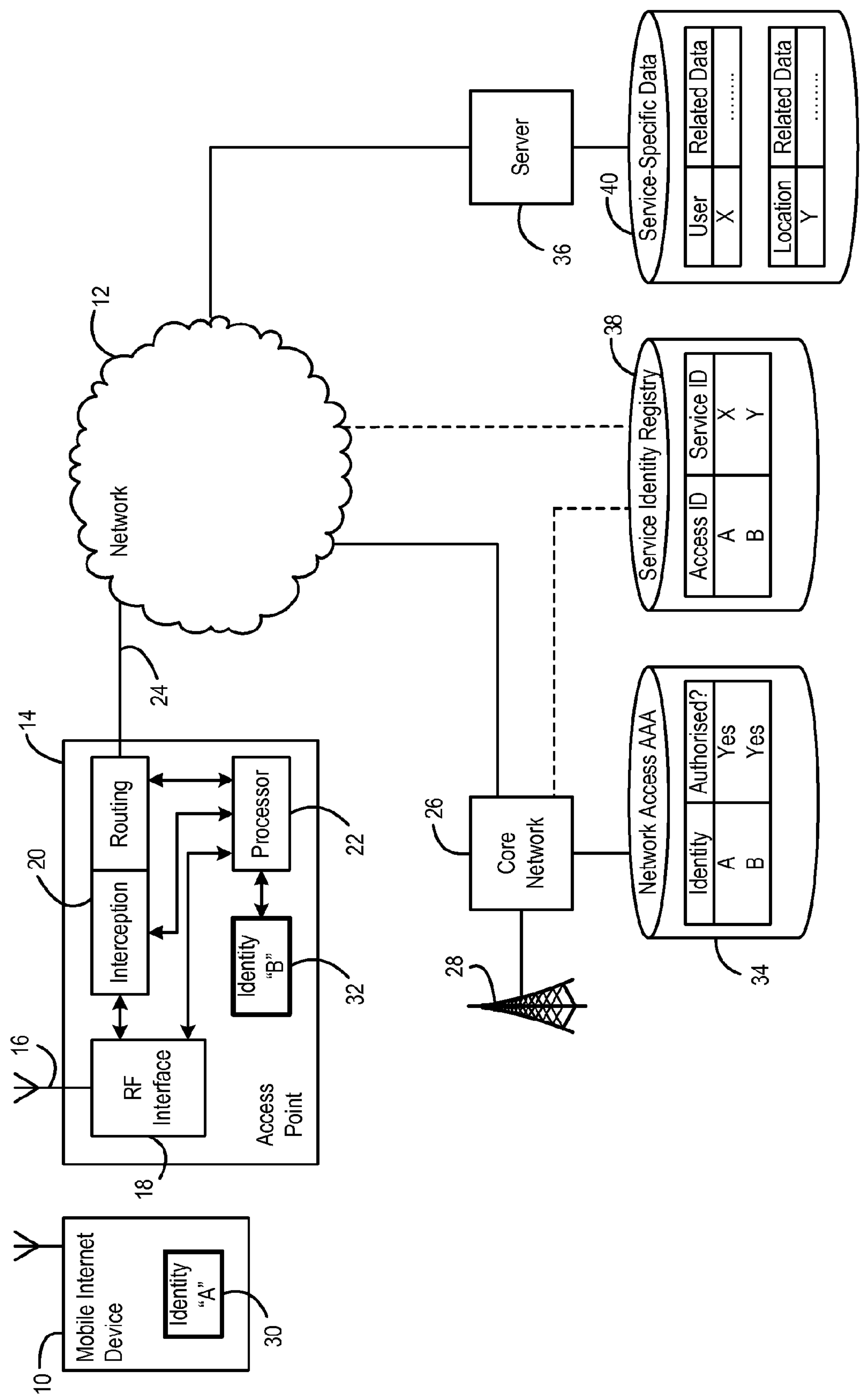
FIG. 1 is a schematic diagram, illustrating a part of a communications network in accordance with the present invention.

FIG. 1 shows a part of a mobile communications network operating in accordance with the present invention.

Specifically, FIG. 1 shows a mobile internet device 10, which is able to connect to a wide area network 12 such as the internet through an access point 14.

The invention will be described in more detail with specific reference to the case where the access point 14 is a femtocell basestation, and the mobile internet device 10 may be a mobile phone or personal computer, that is able to communicate using a cellular communications standard, such as one of the air interface standards associated with the Universal Mobile Telecommunications System (UMTS). Such mobile internet devices are well known, and will not be described further herein, except as necessary for an understanding of the present invention.

The femtocell basestation is of a type that is known, and has an antenna 16 for transmission and reception over the appropriate air interface, connected to RF interface circuitry 18. Received signals are passed to interception and routing circuitry 20, operating under the control of a processor 22. As is known, the femtocell basestation 14 is typically connected to the internet 12 over an existing broadband connection 24 serving the premises in which it is located, and can be connected over the internet 12 to the core network 26 of the cellular communications network, managed by the mobile network operator.

FIG. 1 also shows a macrocell cellular basestation 28 connected to the core network 26. It will be appreciated that the cellular network will typically contain many macrocell cellular basestations, together covering a wide area.

Each femtocell basestation 14, by contrast, will provide coverage only in a small area, for example within the premises of one customer. However, within those premises, the femtocell basestation 14 should be able to provide stronger coverage than the serving macrocell basestation. A mobile device, such as the mobile internet device 10, that is active in the cellular communications network, is thus able to roam between the cells of the macrocell network, and any femtocell that allows such access. For example, a femtocell basestation that is located within a domestic or small customer's premises may be configured so that only devices specifically registered by that customer can gain such access, while other customers may allow any user of the cellular communications network to gain access.

Access to the network is controlled based upon an immutable and unique identity credential embedded within the connecting device. This identity credential often takes the form of a Subscriber Identity Module (SIM), but may be a software certificate installed before first use (i.e. during manufacture). The mobile internet device 10 contains an identity 30 (Identity "A") that the core network verifies against its Authentication, Authorisation and Accounting (AAA) system 34 before granting network access from either the access point 14 or the macrocell 28. The femtocell access point contains an identity 32 (Identity "B") that the core network verifies against its AAA system 34 before allowing the access point to provide connectivity to mobile internet devices.

As mentioned above, the femtocell basestation 14 contains interception and routing circuitry 20, allowing it to interrogate and modify messages sent to and from mobile devices that are connected to it. For example, the femtocell basestation 14 may contain software stacks arranged as described in WO2008/102099, allowing it to intercept messages sent from mobile devices connected to it over a cellular wireless communication protocol, and then allowing it to route traffic as required.

The interception and routing circuitry 20 can thus intercept data sessions involving the mobile device 10, and can determine the best routing for such data sessions. For example, a voice phone call may be routed over the internet 12 into the core network 26 at a suitable point, allowing connection to the called phone. A request to access a website can instead be routed directly over the internet to a server 36 hosting the website, without involvement of the core network 26.

In the context of the present invention, a distinction must be made between the role that the identity 30 plays when the mobile internet device participates in telephony services and when it participates in data sessions. In GSM and UMTS mobile networks the identity 30 is a SIM and the primary identity it contains, on which access control is based, is the IMSI (International Mobile Subscriber Identity). The identity 32 may also be a SIM, although it may be a soft certificate or any similar secure identity token.

The core network maintains a unique relationship between the IMSI and the MSISDN (Mobile Subscriber Integrated Services Digital Network Number), which is the public telephone number that the SIM associates with the device. When the mobile device makes a telephony call, or uses other telephony services such as SMS (Short Message Service), the MSISDN is usually sent as a "Caller Identity" so that the recipient knows from where the call or message originated. Specifically the MSISDN caller identity will identify the same originator over a long timeframe and many calls, independent of where they are when connecting to the network. For data sessions none of the mobile internet device, macrocell or core network inserts a similar identity that lets the server 36 know from where the data session originated. All the server is given is a return IP address for routing a reply, but this address is transient and may be different for each session the mobile internet device initiates with the server. If the server needs to recognise the same device returning between sessions, some independent identity credential with meaning to the server, such as a username or cookie, must be entered into the device.

The present invention describes how the access point 14, using the interception and routing function 20, can insert identities into a data session between the mobile internet device 10 and the server 36. In some embodiments, these identities are the immutable and unique identities 30 and 32, and so the information inserted into the data session is derived directly from the relevant identity token. In other embodiments, as these identities are often regarded as sensitive, the information inserted into the data session is instead statically related to the identity in a manner equivalent to the relationship between IMSI and MSISDN. The identity mapping relationship is held in a service identity registry 38 which may be accessed either via the core network or via the internet depending on commercial considerations. The server 36 will typically store and apply service-specific data 40 in its interactions with the user, and will select this data using the inserted identities in the data session. When an identity associated with the mobile internet device is inserted into the data session, it enables the server to recognise the device (and infer the owner/user). When an identity associated with the access point is inserted into the data session it enables the server to infer the location of the mobile internet device (to a resolution of the access point's coverage).

Figure 2:
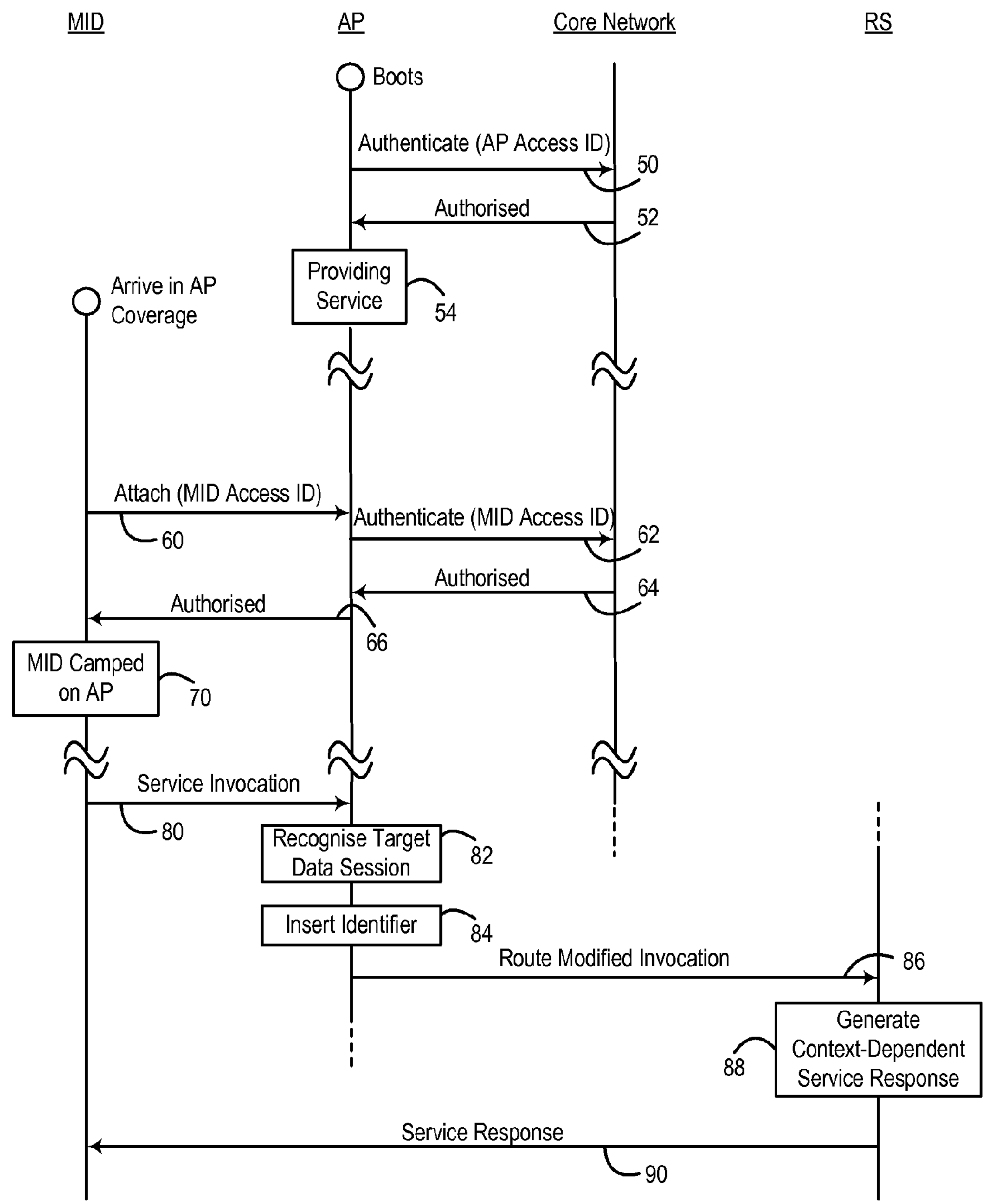
FIG. 2 illustrates an outline of the message flow in a method in accordance with the present invention.

FIG. 2 illustrates a first process according to the present invention, in terms of the message flow between the mobile internet device (MID) 10, the access point (AP) 14, the core network 26 and a remote server (RS) 36. Specifically, the remote server 36 is hosting a remote service, for example in the form of a website. In this illustrated example, the remote service is a location-aware portal. For example, it may be a mobile operator's home website for use by customers of the mobile operator. However, it may equally be any other service, for example providing a search or advertising service.

In this illustrated embodiment, the service is location-aware, in the sense that it can modify the content it serves, based on the user's location. However, in other embodiments, the service may adapt its content based on other aspects of the context, such as the identity of the user.

Firstly, in step 50, when the AP boots, it uses its network access identity 32 to request connection to the core network (step 50) and is authorized (step 52). The access point is ready to provide service (step 54) to mobile internet devices.

Later, when the MID 10 arrives in AP coverage it tries to attach (step 60) using its network access identity 30. The interception and routing function 20 has the opportunity to reject access autonomously (for example a femtocell basestation that is located within a domestic or small customer's premises may be configured with a "closed user group" so that only devices specifically registered by that customer can gain such access) but will typically route the request to the core network (step 62). Assuming that this is authorized (step 64) by the core network, the AP 14 relays (step 66) the response to the MID. If access is granted, the MID is considered camped onto the AP 70 such that the AP will provide network access to the MID as and when required.

In the use phase, as shown in step 80 of FIG. 2, a mobile device attached to the access point attempts to access the remote service. By inspecting the data traffic being passed through it, the access point is able in step 82 to recognise a target data session and intercepts the data. In this barebones message flow a target data session is any data session using an application layer protocol that can be manipulated. One example of such a data session is an HTTP web session, in that the protocol has a pre-defined slot in which cookies can be inserted. Also, XML-based protocols such as XMPP and SIMPLE are inherently extensible, and could have the relevant identifiers injected into the data session.

In step 84, the access point modifies the data sent from the mobile device, inserting the identifier 30 for the MID and/or the identifier 32 for the AP. For example, where the remote service is a website, the access point can modify the data by adding a line to the HTTP header with cookies containing the identities.

Thereafter, the access point 14 continues with transmitting the modified data to the remote service in step 86.

In step 88, the remote service is able to make context-dependent modifications to the data that it provides in response to an access request. The MID identifier 30 can be used by the remote service to identify a particular user, while the AP identifier 32 can be used by the remote service to infer a particular location (either the geographic location or the context i.e. "home", "office", "café"). For example, a location-aware website will use the AP identifier 32 to decide the context-dependent modifications.

In step 90, the remote server 36 returns the data through the access point 14 to the mobile device 10.

FIG. 2 illustrates the basic identity insertion method in accordance with an embodiment of the invention. The method as described with reference to FIG. 2 is sufficient to allow the invention to be put into effect, and may be suitable for use in some deployment situations. However, there are other situations in which that previously described method is unlikely to be commercially acceptable.

Firstly, the network access identities 30 and 32 are considered sensitive by commercial operators of core networks, so it is not desirable to transmit them to the remote service 36. Secondly, indiscriminately inserting identifiers of users and their locations into internet traffic raises privacy issues. Thirdly, the provision of user and location information within a service request can generate significant value for the service provider, and so the access point and core network operator may want to control availability of the information in order to acquire a share of the generated value.

Figure 3:
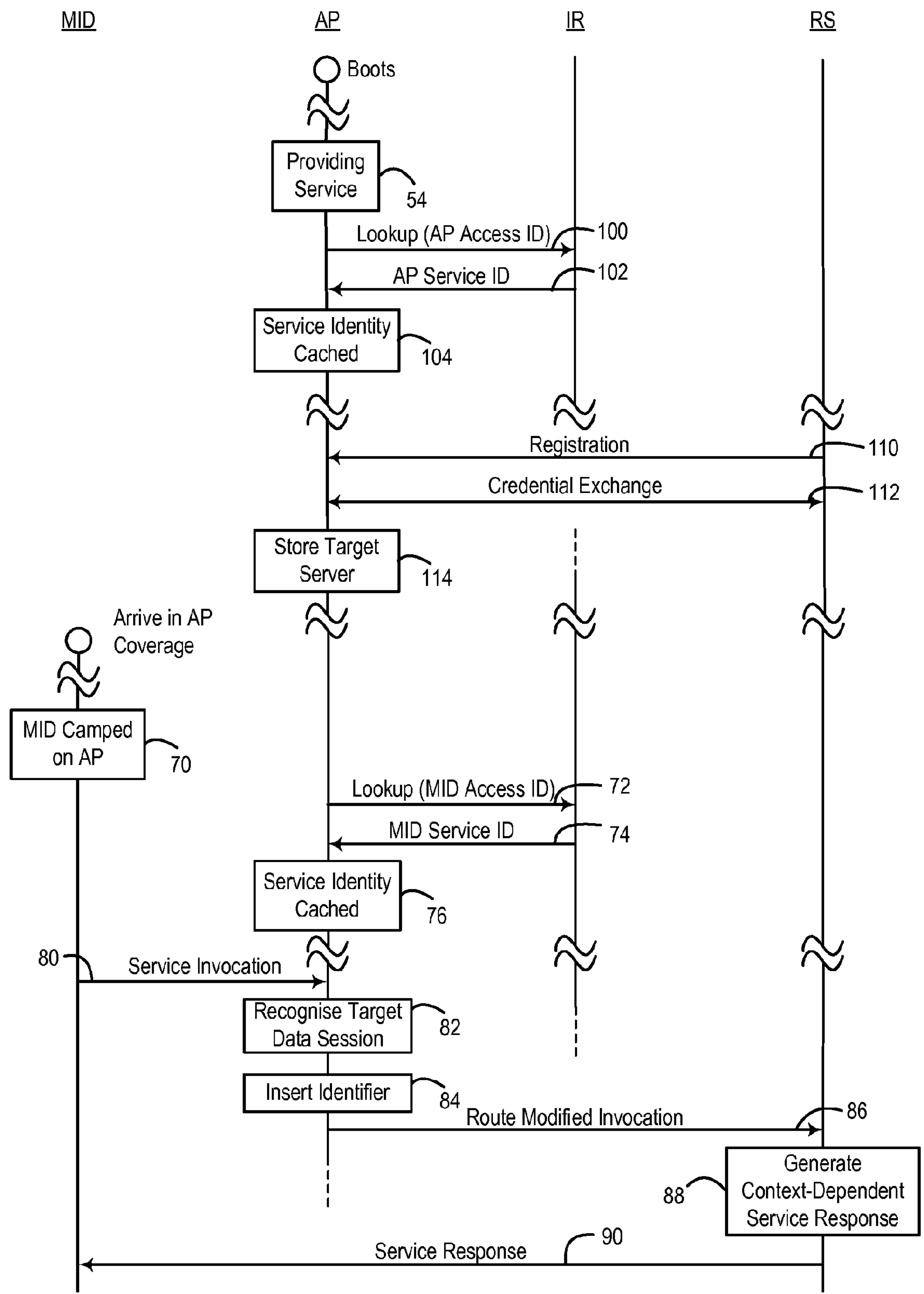
FIG. 3 illustrates in slightly more detail the message flow of the method in accordance with the present invention.

FIG. 3 illustrates a further embodiment of the method according to the present invention, addressing security, privacy and commercial considerations. Specifically, FIG. 3 illustrates the message flow between the mobile internet device (MID) 10, the access point (AP) 14, the identity registry (IR) 38 and a remote server (RS) 36.

The method shown in FIG. 3 has several steps in common with the method shown in FIG. 2. Where steps of the method shown in FIG. 3 are the same as steps of the method shown in FIG. 2 and described above, these will not be described further in detail.

When the AP boots, it uses its network access identity 32 to request connection to the core network, and is authorized, as described with reference to FIG. 2. The access point is then ready to provide service (step 54) to mobile internet devices.

FIG. 3 illustrates the use of the identity registry 38. The identity registry is a database mapping the network access identities 30 and 32 (which are private and sensitive to the network operator) to service identities which may be shared with the remote server 36.

Firstly, after the AP is providing service (step 54), it performs a lookup (step 100) against the identity register 38, where its access identity 32 is passed as a parameter. The identity register returns to the AP its service identity (step 102). On receiving the returned service identity, the AP 14 in step 104 stores the service identity in a cache that it maintains, containing a small subset of service identities from the identity register with which it is concerned. Maintaining this cache avoids the latency and network load that would result from querying the identity register 38 every time the AP requires a service identity.

Secondly, a registration phase takes place, in which, in step 110, the remote service (RS) sends a registration message to the access point (AP). This can take place whenever the remote service determines that it can use identities from that access point, for example when the remote service is first deployed.

The registration message includes a service identifier, describing the way in which a mobile device will access it, typically in the form of Uniform Resource Identifier (URI). The registration message will also specify which of user (MID-associated) or location (AP-associated) identities it wants inserted into any data session when a mobile device subsequently accesses the service. The registration message may also include service-specific substitute identifiers to be used in place of the generic service identifier for the AP that was obtained from the IR in step 102, and in place of the generic service identifier for the MID that is to be obtained from the IR in step 74.

The registration phase includes a credential exchange 112 between the access point and the remote service to establish trust by mutual authentication between the entities, and to establish that the remote service is authorised to make the registration request.

In the case where the remote service 36 is a website, the URI would be a Uniform Resource Locator (URL) and the insertion identifier would be a cookie.

The registration message exchange is an example of a remote procedure call/remote API hosted on the access point 10 so that the remote service 36 can influence and control subsequent behaviour of the access point, as described in more detail in GB-2459107A. Credential exchange 112 for mutual authentication is part of the registration procedure so that unauthorised or malicious use of the remote API can be prevented. Computer protocols between the network nodes 14 and 36 which provide the security and extensibility for embodiments include HTTP(S) and XMPP. Depending on the protocol of an embodiment there would be intermediary servers for routing and authorisation of API messages between the access point 14 and the server 36. These are implied as part of the network infrastructure 12 in FIG. 1 as the details are specific to the protocol chosen and are described by Internet Engineering Task Force (IETF) standards, so will not be described further herein.

Following registration the access point stores in step 114 the details of the target server, as supplied in the registration message. It is possible that the access point 14 may lose power, or for other reasons may occasionally disconnect from and reconnect to the wide area network 12. In order to achieve persistence of the remote service registrations, the access point may contain a non-volatile memory associated with the processor 22 for persistent storage of the registrations of remote services. In this case, the normal operation simply resumes working after power cycling.

As an alternative, registrations can be recorded at a separate entity, such as a server with non-volatile storage, in the wide area network 12, and the access point can be programmed to query that separate entity to obtain past registrations of remote services after power cycling. This would be appropriate for an embodiment that uses HTTP(S) to invoke the remote API on the access point.

As a further alternative, each remote service can store the list of access points with which it requires registration, and can then issue a renewed registration in the event that an access point power cycles. In order to be able to implement this, the access point must issue a presence notification message that will be routed to all remote services when it reconnects to the network after a power cycle. This prompts the remote service to renew the registration. If an embodiment uses XMPP for the remote API then presence notification with registrations stored at the server are a core part of the protocol.

When a mobile internet device (MID) arrives in coverage of the access point (AP) then, in step 70, it will camp on the AP as a result of network access authorisation procedures described previously. The conclusion of these procedures causes the access point to perform a lookup (step 72) against the identity register where the MID's access identity 30 is passed as a parameter. In step 74, the service identity registry 38 returns to the AP the MID's service identity, which, in step 76, the AP adds to the cache of the small subset of service identities from the register with which it is concerned.

As an alternative, if the AP holds a fixed list of authorised MID network access identities (for example the list of devices comprising a "closed user group"), it may lookup and cache their service identities earlier, when it requests its own service identity 100.

In the use phase, as shown in step 80 of FIG. 3, a mobile device attached to the access point attempts to access the remote service. By inspecting the data traffic being passed through it, the access point is able in step 82 to recognise a target data session and intercepts the data. In this case, a target data session is one which is using a protocol that can be manipulated, and is directed to a service which has previously registered. That is, the access point has already performed step 114, and stored the details of the respective target server. In the case where the remote service is a website, the access point specifically inspects the HTTP header in the data traffic. When the host and resource in the HTTP header match the URL registered by the remote service during the registration phase, a target data session is recognised.

In step 84, the access point modifies the data sent from the mobile device, inserting the service identity for the MID and/or the service identity for the AP. As described above, these service identities were obtained originally from the service identity registry 38, but may have been stored in a service identity registry cache in the AP. For example, where the remote service is a website, the access point can modify the data by adding a line to the HTTP header with cookies containing the identities.

Thereafter, the access point 14 continues with transmitting the modified data to the remote service in step 86.

In step 88, the remote service is able to make context-dependent modifications to the data that it provides in response to an access request. The MID identifier 30 can be used by the remote service to identify a particular user, while the AP identifier 32 can be used by the remote service to infer a particular location (either the geographic location or the context i.e. "home", "office", "café"). For example, a location-aware website will use the AP identifier 32 to decide the context-dependent modifications.

In step 90, the remote server 36 returns the data through the access point 14 to the mobile device 10.

There is therefore provided an access point that can be used to provide an improved service to mobile internet device users.

For example, a mobile network operator may have a portal website, hosted on the server 36 that can be accessed whenever a customer presses a specific button on their Internet-capable mobile phone, such as the device 10. The operator has deployed femtocell access points, such as the access point 14, which incorporate an XMPP protocol for service control, into semi-public spaces such as shops. The owner of the location hosting each femtocell may register with the mobile operator a website that is pertinent to their location. For each such location, the portal website (the remote service) registers its own web content with the femtocell. The portal website maintains a lookup table relating access point service identities to the website URL(s) the location owner has supplied for that femtocell.

Now, when a customer is connecting to the network via the macrocellular network, for example through a macrocell basestation 28, and they press the portal button on their phone 10, they will receive the portal home page as usual. However, the service changes behaviour when the customer is in a fast-food outlet, shopping mall, museum, or similar location containing a suitably provisioned femtocell basestation 14, and the customer is connecting to the network via that femtocell basestation.

When the customer presses the portal button in that case, the HTTP request received by the portal website has an additional cookie inserted by the femtocell basestation. The remote service is able to perform an internal lookup using the cookie, to obtain the URL(s) of the local website.

In that case, the remote service is able to take steps so that the content returned to the customer is modified. For example, it may issue an HTTP redirect to the URL of the local website as its response instead of serving its homepage. The web browser on the customer's mobile internet device 10 will automatically request this local website, with the result that the user may receive a menu, a store directory or map, vouchers, a guide or other relevant local information, instead of the portal homepage.

As an alternative, the remote service may serve the portal homepage, having modified it to include or embed links or content relevant for, or specific to, that location using the URLs stored for that location.

Thus, service providers in the physical world, such as fast-food outlets, shopping malls or museums, can improve the experience of visiting customers by providing useful information, offers or faster service via the customer's mobile Internet device.

As described so far, the content returned by the remote service can be modified based on the specific access point through which the service was requested. In other embodiments of the invention, the content can be modified based on the identity of the customer making the request.

For example, if the identity of the specific mobile device or user is important to the remote service, it can arrange for the mobile device initiating the data session to include an appropriate identity, for example a cookie written into HTTP headers by a web browser running on the mobile device.

However, this can also be achieved by a variation of the process shown in FIGS. 2 & 3 and described above, with the advantage that the access point will insert the cookie identifying the user on every access to the service including the first, while the web browser running on the mobile device can only insert a cookie that was stored to it on a previous access of the service.

The invention claimed is:

1. A cellular basestation, configured to allow a device to connect thereto over a wireless interface, wherein the cellular basestation is able to establish a connection to a cellular core network such that the cellular core network requires an identity token configured to identify the cellular basestation and authorize the cellular basestation to the cellular core network, and wherein the cellular basestation is able to have a connection to a Wide Area Network, such that it can route data traffic from connected devices over the Wide Area Network to a remote service outside of the cellular core network and, in the event that data traffic received at the cellular basestation from a connected device comprises a service request for the remote service, the cellular basestation is adapted to insert information derived from the identity token used to authorize the cellular basestation to the cellular core network into the data traffic, and to forward the modified data traffic including the inserted information derived from the identity token to the remote service, wherein the inserted information provides to the remote service contextual information for the cellular basestation.

2. A cellular basestation as claimed in claim 1, wherein the identity token identifies the connected device.

3. A cellular basestation as claimed in any preceding claim, wherein the identity token is stored within a SIM.

4. A cellular basestation as claimed in any of claims 1 to 2, wherein the identity token comprises a certificate.

5. A cellular basestation as claimed in any of claims 1 to 2, wherein, in the event that the data traffic from the connected device is intended for the remote service, the cellular basestation is adapted to:

obtain from a service identity registry a service identity corresponding to the identity token, and to insert the service identity into the data traffic, and to forward the modified data traffic to the remote service.

6. A cellular basestation as claimed in any of claims 1 to 2, wherein the cellular basestation includes an API, which can be used by the remote service to register itself with the cellular basestation, such that the cellular basestation will insert identities only into data traffic being routed to registered services.

7. A cellular basestation as claimed in claim 6, wherein the API included in the cellular basestation, used by the remote service to specify a service identifier, uses XMPP to transport API messages between the cellular basestation and the remote service.

8. A cellular basestation as claimed in claim 6, wherein the cellular basestation is adapted to store received registration information relating to the remote service only after authenticating the remote service.

9. A cellular basestation as claimed in claim 6, wherein the cellular basestation is adapted to store received registration information in non-volatile memory such that, in the event of a power interruption, the stored received registration information is not lost.

10. A cellular basestation as claimed in claim 9, wherein the non-volatile memory is in the cellular basestation.

11. A cellular basestation as claimed in claim 9, wherein the non-volatile memory is located remote from the cellular basestation, accessible over a network.

12. A cellular basestation as claimed in claim 6, wherein the cellular basestation is adapted, in the event of a power interruption, to signal its renewed availability to the remote service following the power interruption, such that the remote service may renew its registration information with the cellular basestation.

13. A cellular basestation as claimed in claim 12, wherein the cellular basestation is adapted to signal its renewed availability to the remote service following the power interruption using XMPP.

14. A cellular basestation as claimed in any of claims 1 to 2 wherein, when the data traffic from the connected device is an HTTP request, the cellular basestation is adapted to inspect an HTTP header of the HTTP request and modify the HTTP header by inserting the information derived from the identity token as a Cookie into the HTTP header.

15. A cellular basestation as claimed in claim 14, wherein, at registration with the cellular basestation, remote services identify themselves by URLs, and when the cellular basestation inspects the HTTP header it only modifies the HTTP header if a Host entry in the HTTP header matches a URL in stored registration information.

16. A cellular basestation as claimed in claim 14, wherein, at registration with the cellular basestation, remote services identify themselves by URLs, and when the cellular basestation inspects the HTTP header it only modifies the HTTP header if the concatenation of the Host entry with the Request URI entry in the HTTP header matches a URL in stored registration information.

17. A cellular basestation as claimed in any of claims 1 to 2, wherein, in the event that data traffic from a connected device is intended for the remote service, the cellular basestation is adapted to insert information derived from the identity token into an application layer of the data traffic, and to forward the modified data traffic to the remote service.

18. The cellular basestation of claim 1, wherein the identity token is a unique identity credential configured to authorize the cellular basestation to the cellular core network.

19. The cellular basestation of claim 1, wherein the remote service is a website hosted by a remote server outside of the cellular core network.

20. The cellular basestation of claim 1, wherein the remote service is configured to provide a context-dependent service response based on the contextual information for the cellular basestation.

21. The cellular basestation of claim 1, wherein the contextual information for the cellular basestation comprises location information for the cellular basestation.

22. A femtocell basestation, configured to allow a device to connect thereto over a wireless interface, wherein the femtocell basestation is able to establish a connection to a cellular network such that the cellular network requires an identity token configured to identify the femtocell basestation and authorize the femtocell basestation to the cellular network, and wherein the femtocell basestation is able to have a connection to a Wide Area Network, such that it can route data traffic from connected devices over the Wide Area Network to a remote service outside of the cellular network and, in the event that data traffic from a connected device is intended for the remote service, the femtocell basestation is adapted to insert information derived from the identity token used to authorize the femtocell basestation to the cellular network into the data traffic, and to forward the modified data traffic including the inserted information derived from the identity token used to authorize the femtocell basestation to the cellular network to the remote service outside of the cellular network.

* * * * *